United States Patent [19]
Johnston et al.

[11] Patent Number: 6,148,952
[45] Date of Patent: Nov. 21, 2000

[54] HYDRAULIC SLOTTED CYLINDER SOURCE

[75] Inventors: Otis A. Johnston, Spring; Michael W. Norris, Cypress, both of Tex.

[73] Assignee: Western Atlas International, Inc., Houston, Tex.

[21] Appl. No.: 09/541,194

[22] Filed: Apr. 3, 2000

[51] Int. Cl.$^7$ ........................................ G01V 1/04
[52] U.S. Cl. ............................. 181/120; 367/143
[58] Field of Search ................... 181/110, 113, 181/120; 367/141, 142, 143

[56] References Cited

U.S. PATENT DOCUMENTS

| | | | |
|---|---|---|---|
| 5,459,699 | 10/1995 | Walter | 367/143 |
| 6,002,648 | 12/1999 | Ambs | 181/120 |

*Primary Examiner*—Khanh Dang
*Attorney, Agent, or Firm*—Alan J. Arkinson

[57] ABSTRACT

An apparatus for generating acoustic source energy in a liquid medium. A slotted cylinder has an interior volume filled with a fluid. An actuator selectively pressurizes the fluid to expand the slotted cylinder. Movement of the slotted cylinder due to expansion and contraction generates a pressure pulse in the liquid medium to create acoustic source energy. The device provides an acoustic source for marine seismic operations and for use downhole in a borehole.

19 Claims, 1 Drawing Sheet

HYDRAULIC SLOTTED CYLINDER SOURCE

BACKGROUND OF THE INVENTION

The present invention relates to the field of seismic sources for evaluating geophysical structures. More particularly, the invention relates to an improved seismic source using a pressurized fluid within a slotted housing to generate seismic source energy.

Seismic sources are operated in open water and downhole in boreholes to generate acoustic source energy. In marine geophysical operations, seismic vessels tow vibrators, air guns, explosives, and other acoustic projector techniques to generate seismic source energy. The seismic source energy is represented by a pressure pulse in the water which travels downwardly through the water and underlying geologic structures and is reflected from interfaces between the geologic structures. The reflected signal impulses return to the water column and are detected with sensors towed behind the seismic vessel or laid on the water bottom. To evaluate the geologic structures proximate to a borehole, acoustic source energy is generated a the surface or downhole and is detected with sensors located at the surface, in adjacent boreholes, or in the same borehole.

Marine seismic operations use high powered acoustic signals near 190 dB/Hz re micro Pascal in a low frequency band between 5–120 Hz. High power signals penetrate deep within subsurface geologic structures, and low frequency signals experience less attenuation than higher frequency signals. High power, low frequency source signals for marine geophysical operations are typically generated with air guns or other acoustic sources. U.S. Pat. No. 3,896,889 to Bouyoucos (1975) disclosed a mass oscillation system for generating acoustic source energy in water. Other devices generate an acoustic signal by transmitting high velocity water jets into the underwater water environment. U.S. Pat. No. 4,131,178 to Bouyoucos (1978) and U.S. Pat. No. 4,153,135 to Bouyoucos (1979) disclosed a moveable piston for generating high velocity water jets. U.S. Pat. No. 4,234,052 to Chelminski (1980) disclosed another liquid jet acoustic source system. Improvements to liquid jet acoustic source systems were disclosed in U.S. Pat. Nos. 4,695,987 to Buoyoucos (1987) and 4,753,316 to Buoyoucos et al. (1988).

Another type of seismic source system releases compressed air through various mechanical firing systems into the water. U.S. Pat. No. 4,180,139 to Walker (1979) disclosed one type of air gun, and U.S. Pat. No. 4,285,415 to Paitson (1981) disclosed a mechanism for controlling the discharge of compressed air. U.S. Pat. No. 5,228,010 to Harrison (1993) disclosed a shuttle air gun for generating acoustic source energy.

Slotted cylinders have been used in different applications to generate relatively high frequency, low power pressure pulses in water. Such cylinders use complicated piezoelectric crystal stacks attached to the interior wall of a slotted cylinder and require numerous electrical power connections. Acoustic vibrators have been used in submarine operations to detect and to locate the position of vessels and underwater objects, however such vibrators do not operate at the power levels and frequency necessary in geophysical seismic operations. An example of a high frequency, low power system is described in U.S. Pat. No. 3,875,552 to Hogman et al. (1975) wherein sonar signals were transmitted from a mobile, underwater target. Another type of marine acoustic output generator was disclosed in U.S. Pat. No. 5,875,154 to Dechico (1999), wherein stacks of piezoelectric elements were arranged between first and second end caps of a radiator.

In addition to the high frequency, low power electromechanical transducers described above for submarine operations, slotted transducers have been used in loud speakers and in underwater sonar applications. Proposed uses for such transducers include pile drivers, trench diggers, gravel packers, replaceable knives or drills or surgical blades, sonic tools in oil wells, and sonobuoy and sonar installations. U.S. Pat. No. 4,257,482 to Kompanek (1981) disclosed a sonic gravel packing method for downhole boreholes.

Other forms of electromechanical transducers have been developed. U.S. Pat. No. 4,220,887 to Kompanek (1980) described a slotted electromechanical transducer having a resilient member in the slot for prestressing the transducer and for preventing contact between adjacent transducer ends. U.S. Pat. No. 4,651,044 to Kompanek (1987) specifically attempted to produce large amounts of power at low frequency, however the frequency range was in the order of "several kilocycles". U.S. Pat. No. 5,122,992 to Kompanek (1992) disclosed a transducer member having a closure member extending in a U-shaped configuration. The length of the closure member defined the bandwidth of the vibration frequency produced. In U.S. Pat. No. 5,267,223 to Flanagan et al. (1993), a compliant cover was bonded to a transducer shell.

Conventional seismic source technology does not efficiently provide high power, low frequency source energy from a simple operating system. Piezoelectric crystal systems require electronic systems having electrical sources susceptible to failure, and such failure can significantly complicate downhole wellbore operations. Large downhole pressures can generate failure of piezoelectric components, therefore limiting use of the acoustic source devices in certain applications. There is, accordingly, a need for an improved seismic source generator which can reliably provide acoustic source energy in different operating environments.

SUMMARY OF THE INVENTION

The present invention provides an apparatus for generating acoustic source energy in a liquid medium. The apparatus comprises a slotted container having walls which define an enclosed interior, a fluid within the container interior, and an actuator for selectively pressurizing said fluid to expand the slotted container to generate the acoustic source energy.

In different embodiments of the invention, the slotted container can comprise a slotted cylinder and can include inner and outer walls having a substantially uniform wall thickness. The actuator can be capable of pulse or amplitude modulation, and the apparatus can be configured for marine seismic operations or for operation downhole in a wellbore. Multiple slotted cylinders can be combined into an integral assembly, or packers can isolate slotted cylinders at different elevations downhole in a wellbore.

DESCRIPTION OF THE PREFERRED EMBODIMENTS

Figure 1:
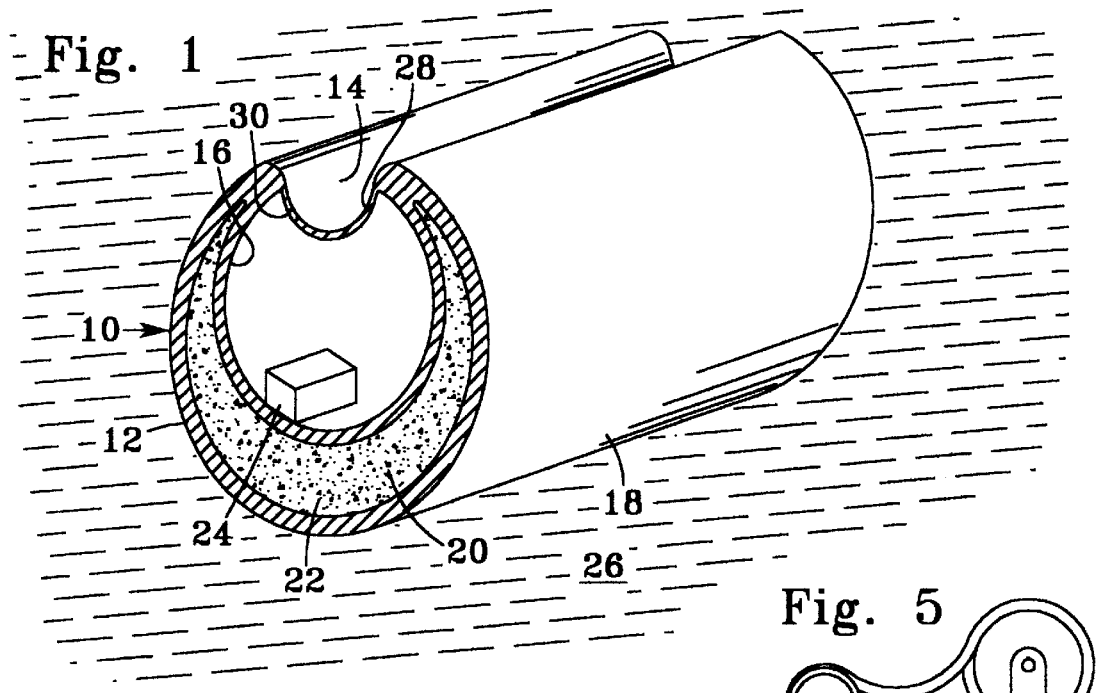
FIG. 1 illustrates a hydraulic operated slotted cylinder having fluid enclosed within the housing interior.
Figure 2:
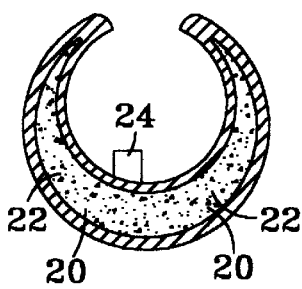
FIGS. 2 and 3 illustrate different combinations of housing interiors.
Figure 3:
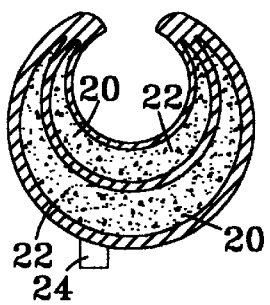

The invention provides an improved seismic system for use in geophysical evaluation operations. Referring to FIG. 1, acoustic source apparatus 10 is illustrated as comprising container or housing 12 having slot 14, inside wall surface 16, outside wall surface 18, and enclosed housing interior 20. Fluid 22 is located within housing interior 20 and is selectively pressurized with actuator 24. Fluid 22 can comprise a liquid or gas and is retained within housing interior 20 or can be selectively withdrawn from housing interior 20. Although housing 12 is illustrated as a slotted cylinder having a hollow housing interior 20, housing 12 can take different shapes and configurations. The desired shape of housing 12 can be selected to control the direction, amplitude, and shape of an energy pulse. Housing 12 can comprise a container having one or more housing interiors 20 as shown in FIGS. 2 and 3 for selectively holding fluid 22.

In a preferred embodiment of the invention, fluid 22 is maintained at a selected initial pressure to maintain the initial configuration of housing 12 relative to the liquid medium 26 surrounding housing 12. Actuator 24 is operable to increase or to decrease the pressure of fluid 22 within one or more housing interiors 20. Actuator 24 can include a controller or can communicate with a separate controller operable from a remote location.

The change in fluid 22 pressure moves housing 12 relative to slot 14 and displaces liquid medium 26 to create acoustic source energy in the form of a pressure field or pulse. Radial movement of housing 12 is facilitated by slot 14 and produces a pressure field or pulse in liquid medium 26. The resulting pressure pulse provides the seismic source energy sufficient for penetrating subsurface geologic formations to provide seismic or other acoustic data. In a preferred embodiment of the invention, the pressure of fluid 22 is rapidly increased to expand housing 12 radially outwardly to generate a pressure pulse in liquid medium 26. In other embodiments of the invention, housing 12 can be configured to move inwardly or in other directions upon pressurization of fluid 22.

Actuator 24 can be located proximate to housing 12 or can be located at a position away from housing 12. In marine operations, actuator 24 can be attached to housing 12 or can be remotely located on a marine seismic vessel. In a borehole, actuator 24 can be located next to housing 12 or can be located at the borehole surface. Actuator 24 can comprise a pump, control devices, and battery components, and other functional components. In different embodiments of the invention, actuator 24 can modulate movement of housing 12 by selectively controlling pressure of fluid 22. Actuator 24 can modulate housing 12 movement by pulse modulation or by amplitude modulation.

Container or housing 12 can be cylindrical, circular, elliptical or another shape and can incorporate one or more slots 14 for permitting expansion or contraction of housing 12 or other movement sufficient to produce a pressure pulse. Slot 14 can comprise a stress relief recess, slot portion or other structural discontinuity integrated along all or a portion of housing 12.

To construct one embodiment of housing 12, two concentric pipes can be split or segmented lengthwise and welded or otherwise connected together along the length. The ends can be closed to create housing interior 20, and appropriate fluid connections can be made between housing interior 20 and actuator 24. For a downhole acoustic energy source, coiled tubing sections could be integrated to create housing 12.

A sleeve such as flexible seal 28 or another type of connector can bridge slot 14. Seal 28 may comprise any suitable sealing material including rubber, synthetic cloth, plastic, composites, and spring steel, and provides for flexural movement of housing 12. Although seal 28 does not require fluid tight capabilities, seal 28 preferably encloses the inside of housing 12 to prevent fluid intrusion within the inside space defined by housing 12. Seal 28 is shown in FIG. 1 as wrapping completely around housing 12 circumference, however seal 28 could also be limited to the area proximate to slot 14. Seal 28 includes fold 30 to permit elastic, radial expansion and contraction of housing 12 without mechanically stressing seal 28.

Housing 12 in a slotted cylinder form provides an effective means for creating vibratory signals. The diameter of the cylinder determines the resonate frequency and the length of the cylinder determines the power radiated by apparatus 10. Such configuration is preferred to flat or circular plate vibratory sources.

To produce high power acoustic pressure at low frequencies suitable for marine seismic operations, an acoustic projector such as source apparatus 10 should have a large surface area displaced over a relatively large distance. If the acoustic projector is small relative to the signal wavelength produced, the following source equation models a simple source as a sphere having the same surface area as the model acoustic projector. This formula relates the acoustic pressure displaced to the area, frequency and displacement of the projector surface.

$$\text{pressure }(p) = \frac{\pi \rho f^2 A d}{r}$$

where $\rho$=density;

f=frequency;

A=projector area;

d=area displacement; and r=observation distance.

Morse and Ingard, *Theoretical Acoustics* (1968). For a single submerged marine vibrator to produce high-pressure, low-frequency acoustic signals, the surface area of the projector should be large and the driving actuator should be powerful. In marine seismic operations, apparatus 10 can be sized to provide acoustic signals of at least 190 dB/Hz re micro Pascal and in a frequency range less than 120 Hz. In a preferred embodiment of the invention for marine operations, apparatus 10 generates acoustic signals in a frequency range between 5 and 120 Hz. The invention permits near point source generation of acoustic source energy instead of using multiple air guns scattered over the width of a towed seismic array and instead of depending on piezoelectric elements.

Figure 4:
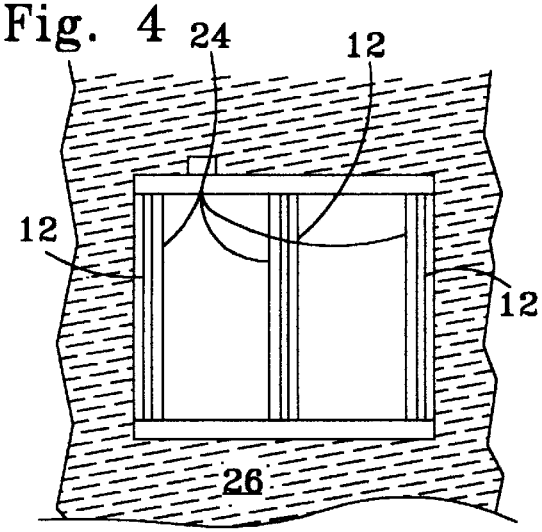
FIG. 4 illustrates an array of slotted cylinders.

FIG. 4 illustrates another embodiment of the invention wherein two or more housings 12 are assembled or bundled to create different functional results. Housings 12 can have different sizes or shapes to generate different pulse forms in liquid medium 26. Actuator 24 can be operated to selectively control one or more of housings 12 in a selected sequence or order or combination, or time. In this manner, the size, duration, magnitude, shape, and continuity of each pulse can be adjusted without requiring additional acoustic energy source components. This combined housing 12 assembly can be configured for open water or for the narrow space downhole in a borehole.

Figure 5:
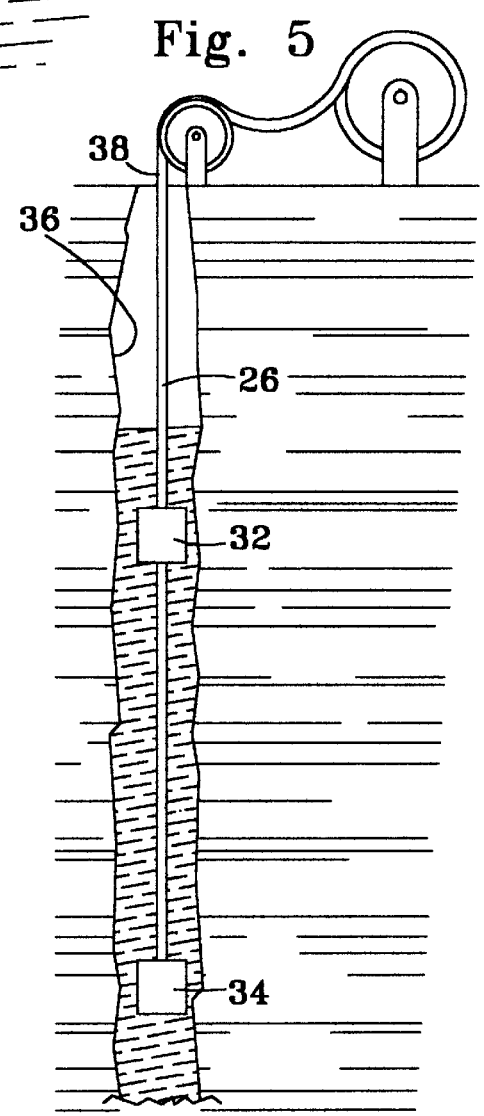
FIG. 5 illustrates two slotted cylinders placed at different locations within a borehole.

FIG. 5 illustrates another embodiment of the invention wherein housings 32 and 34 are positioned downhole in borehole 36. Packers 38 isolate housings 32 and 34 from other elevations within borehole 36. By using this configuration, fluid control over each housing can be hydraulically maintained without interfering with other housings or well components within borehole 36. Housing 32 can be dedicated in borehole 36 in an inactive state and can be selectively activated during future completions or workover operations to perform a desired function. Existing tubulars such as coiled tubing 38 can transport the acoustic source housings 32 and 34 in borehole 36. The interior of coiled tubing 38 can be filled with hydraulic fluid 26 or other liquid to compensate for the depth of housings 32 and 34. Acoustic source energy can be created by pulse or amplitude modulation of the hydraulic fluid 26. Packers (not shown) can acoustically isolate each housing from the other by defining a discrete volume within borehole 36. A finely spaced array of housings 32 or 34 can be moved to different depths within a vertical borehole 36, or to different locations within a horizontal or slanted borehole 26, to create finely spaced reverse VSP or a tomographic source. The resulting acoustic signals can drive housings 32 or 34 as traditional vibroseis type signals or as pressure pulses for generating a Sosie type signal.

The invention provides numerous advantages over prior art seismic source techniques. By providing for hydraulic amplification of housing 12, the mechanical simplicity of the invention provides superior performance when compared with conventional systems having complex piezoelectric or mechanical components subject to wear, tuning requirements, and complex electrical interfaces. Whereas piezoelectric components are limited to particular temperature and pressure operating ranges, the invention is adaptable to environments having extreme temperatures or pressures. This feature of the invention significantly increases the long term operational reliability. The cost of the invention is significantly less than conventional acoustic energy sources, and the selectivity over the frequency content and power of the source energy offers significant data processing capabilities not available with conventional systems.

The reliance upon a simple elastic system in the form of a movable housing substantially eliminates frictional wear, mechanical wear, and abrasion between the operable parts. The invention is economic to manufacture and operate and provides an reduced friction, dependable seismic energy source for marine operations or for completions or workover operations downhole in a borehole. The component materials and configuration can be selected to provide flexibility and freedom from fatigue and other failure sources, and waterproofing is not essential to operation of the system.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. An apparatus for generating acoustic source energy in a liquid medium, comprising:

a slotted container having walls which define an enclosed interior;

a fluid within said container interior; and an actuator for selectively pressurizing said fluid to move said slotted container to generate the acoustic source energy.

2. An apparatus as recited in claim 1, wherein said slotted container comprises an inner wall and an outer wall having substantially uniform wall thicknesses.

3. An apparatus as recited in claim 1, wherein said fluid comprises a liquid.

4. An apparatus as recited in claim 1, wherein said actuator comprises a pump.

5. An apparatus as recited in claim 1, wherein said actuator is capable of repeatedly pressurizing and depressurizing said fluid.

6. An apparatus as recited in claim 5, further comprises a controller for operating said actuator.

7. An apparatus as recited in claim 1, wherein said actuator is capable of modulating movement of said slotted container by controlling said fluid pressurization.

8. An apparatus as recited in claim 7, wherein said actuator is capable of pulse modulating movement of said slotted container.

9. An apparatus as recited in claim 7, wherein said actuator is capable of amplitude modulating movement of said slotted container.

10. An apparatus as recited in claim 1, further comprising at least two slotted containers operable to generate a combined acoustic source energy signal.

11. An apparatus as recited in claim 10, wherein said slotted containers are configured for placement downhole in a wellbore.

12. An apparatus as recited in claim 11, wherein said slotted containers are positionable at different elevations in the wellbore, further comprising a packer for selectively isolating each slotted container from the other.

13. An apparatus as recited in claim 1, wherein said slotted container is configured for placement downhole in a wellbore, and wherein said fluid is initially pressurized to a selected amount based on a selected location downhole in the wellbore to counteract downhole wellbore liquid medium pressure.

14. An apparatus as recited in claim 1, wherein said actuator is capable of moving said slotted container radially inwardly.

15. An apparatus for generating acoustic source energy in a liquid medium, comprising:

a slotted cylinder having walls which define an enclosed interior, wherein said cylinder walls are moveable to generate the acoustic source energy in the liquid medium;

a liquid within said cylinder interior; and an actuator for selectively changing the pressure of said fluid to move said slotted cylinder walls.

16. An apparatus as recited in claim 15, wherein said slotted cylinder comprises an inner wall and an outer wall having substantially uniform wall thicknesses.

17. An apparatus as recited in claim 15, wherein said actuator is capable of selectively increasing the pressure of said liquid to move said slotted cylinder.

18. An apparatus as recited in claim 15, wherein said actuator is capable of selectively decreasing the pressure of said liquid to move said slotted cylinder.

19. An apparatus as recited in claim 15, further comprising a sleeve surrounding said slotted cylinder for preventing intrusion of the liquid medium into contact with said slotted cylinder.

* * * * *